United States Patent [19]

Leech

[11] Patent Number: 4,480,166
[45] Date of Patent: Oct. 30, 1984

[54] RESISTANCE WELDING OF ZINC-COATED STEEL

[75] Inventor: Howard E. Leech, Anderson, Ind.

[73] Assignee: General Motors Corporation, Detroit, Mich.

[21] Appl. No.: 475,318

[22] Filed: Mar. 14, 1983

[51] Int. Cl.³ .................... B23K 11/16; B32B 15/01
[52] U.S. Cl. .................................. 219/118; 219/91.2; 219/93; 428/659; 428/677; 428/683
[58] Field of Search ............... 219/118, 117.1, 91.2, 219/93; 428/659, 677, 683

[56] References Cited

U.S. PATENT DOCUMENTS

| | | | |
|---|---|---|---|
| 3,102,190 | 8/1963 | Chapleur et al. | 219/118 |
| 3,858,911 | 1/1975 | Martin | 285/173 |
| 3,993,238 | 11/1976 | Brook et al. | 228/198 |

OTHER PUBLICATIONS

American Society for Metals, *Metals Handbook*, 8th Edition, vol. 6, Welding and Brazing, 1971, pp. 421–422.

*Primary Examiner*—C. L. Albritton
*Assistant Examiner*—Alfred S. Keve
*Attorney, Agent, or Firm*—Douglas D. Fekete

[57] ABSTRACT

A method for resistance welding zinc-coated steel members is described wherein at least one member comprises a copper layer intermediate the steel and the zinc coating. The copper layer melts during welding and seals fissures within the fused steel to produce a hermetic weld. The copper layer also protects exterior surfaces where the zinc coating is disrupted by the welding operation.

3 Claims, 2 Drawing Figures

RESISTANCE WELDING OF ZINC-COATED STEEL

BACKGROUND OF THE INVENTION

This invention relates to forming a hermetic resistance weld between zinc-coated steel members and to improving corrosion protection of external surfaces where the zinc coating is disrupted by the welding process. More particularly, this invention relates to resistance welding zinc-coated steel members wherein at least one member includes a copper plate intermediate the steel substrate and the zinc coating.

Resistance welding is employed for forming a lap joint between thin steel members. An electrical current passing between the members resistively heats the faying surfaces and fuses the steel. The current is passed between opposed electrodes in contact with exterior surfaces of the joint. Resistance between the electrode and the member generates heat also at the contact surface.

When steel members having metallic zinc coatings for corrosion protection are resistance welded, it has been found that zinc vaporizes from the faying surfaces prior to fusion of the steel substrates. Zinc may also vaporize from the electrode contact surface, thereby exposing the steel at an outer surface that is susceptible to corrosion. The vaporized zinc forms a black smut that deposits on nearby surfaces, including the electrodes. Smut accumulation, and the increased electrode cleaning necessitated thereby, may be one reason that relatively short electrode life has been reported for resistance welding zinc-coated steel.

In some applications, a resistance weld is desired not only to join the members together, but also to form a hermetic seal. However, there is a tendency for microscopic fissures to form in the fused steel, which fissures may extend through the weld and permit air leakage. Formation of a hermetic weld between zinc-coated steel is complicated by the process by which zinc is vaporized and expelled from between the faying surfaces.

Therefore, it is an object of this invention to provide an improved method for resistance welding a zinc-coated steel member to produce a hermetic joint and to protect the steel against corrosion, particularly at external surfaces, such as at electrode contact surfaces, where the zinc coating is disrupted by the welding process.

More particularly, it is an object of this invention to provide a resistance welding method for a zinc-coated steel component that forms in-situ a transient, nonferrous metallic liquid during welding that flows into fissures within the fused steel and, upon solidification, hermetically seals the weld. Furthermore, the method forms a corrosion inhibitive coating protecting the steel at external surfaces where the zinc coating is disturbed by the welding process. The method of this invention does not require an increase in welding electrical energy and may possibly extend electrode life.

SUMMARY OF THE INVENTION

These and other objects are accomplished by resistance welding a zinc-coated steel member that comprises a thin metallic copper layer intermediate the steel substrate and the zinc coating. A preferred member is prepared by first electroplating copper onto the steel and thereafter electroplating zinc over the copper. Both plates preferably coat the entire member, including a faying surface and an electrode contact surface for the intended welding operation.

In a preferred embodiment, the dual-plated member is welded to a second, zinc-coated steel member. The members are arranged with faying surfaces in juxtaposition. An electrode is brought into contact with each member at an outer surface opposite the region of the intended weld. The weld is formed by a process similar to spot welding, but the electrodes are sized and shaped to produce an elongated weld that forms a continuous seam between the members. The electrodes are forced together to press the faying surfaces into intimate contact. A short duration, high amperage, alternating electrical current is applied between the electrodes to resistively heat the faying surfaces to a temperature sufficient to fuse steel. Prior to fusion, zinc is vaporized and expelled from between the faying surfaces. The copper melts and is extruded from the weld region as a result of the pressure applied by the electrodes. This exposes the underlying steel for interfusion. After the pulse, the weld region cools. Because of its higher melting point, the fused steel nugget solidifies before the copper. Molten copper is drawn by capillary action into any fissure that forms in the fused steel and thereafter solidifies to seal the fissure. The major portion of copper solidifies at the periphery of the fused steel nugget, forming a braze-like bond extending between the faying surfaces, further strengthening and sealing the joint.

During welding, the electrical current also resistively heats a localized region of the dual-plated surface adjacent the electrode contact to cause zinc to vaporize, whereupon the copper plate is revealed. It has been found that some zinc alloys into the exposed copper plate to form a brass surface. Thereafter, when the welded assembly is exposed to a corrosive environment, this copper layer protects the steel. Although this layer is susceptible to corrosion, this is generally slower to develop and less noticeable than the rusting of bare steel. However, metallic zinc tends to maintain an attractive, bright metallic appearance in a corrosive environment and is therefore preferred for the majority of the welded assembly.

Thus, the method of this invention permits individual members to be precoated with zinc prior to welding while providing corrosion protection of external surfaces where welding-induced coating disruption would otherwise expose bare steel. Concurrently, the method produces an airtight weld. In a production setting wherein a series of welded assemblies is manufactured, the method reduces maintenance, particularly for cleaning the electrode which makes contact with the dual-plated surface, and may extend electrode life. This is in part attributed to a reduction in smut formation and accumulation on the electrode. Electrode life comparable to uncoated steel is achieved.

DETAILED DESCRIPTION OF THE INVENTION

Figure 1:
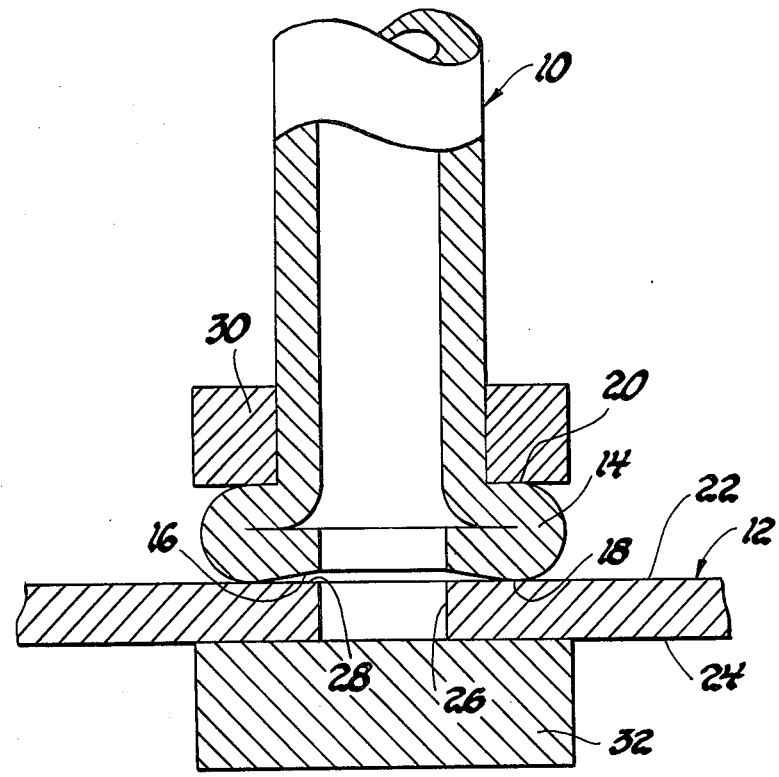
FIG. 1 is a cross-sectional view showing members arranged with electrodes for carrying out a preferred resistance welding operation in accordance with this invention.

Referring to FIG. 1, a preferred embodiment of this invention is illustrated by a resistance welding operation wherein a generally cylindrical, dual-plated air tube 10 is perpendicularly joined and hermetically sealed to a galvanized steel case 12 in the manufacture of an automotive vacuum actuator. Tube 10 comprises an end flange 14 for forming the welded joint. At flange 14, tube 10 bends outwardly and is crimped over. Flange 14 has an end surface 16, which is a faying surface of the intended joint. Surface 16 is flared so as to form an annular resistance welding projection 18. Flange 14 also includes an annular flat surface 20 opposite surface 18 and perpendicular to tube 10. Tube 10 is formed of AISI 1010 mild steel. The outer diameter is about 0.14 inch and the wall thickness is about 0.032 inch. The outer diameter of flange 14 is about 0.24 inch.

In accordance with this invention, tube 10 is coated prior to welding sequentially with thin copper and zinc plates, not shown in the drawings because of the scale for depicting tube 10 and the relative thinness of the plates. In preparation for plating, the flanged tube is cleaned by immersion in a hot, aqueous alkaline solution; rinsed; pickled by immersion in an aqueous, mild acidic solution; and rinsed. The tube is immersed in a conventional copper plating bath containing copper cyanide and cathodically biased to electrodeposit metallic copper from solution onto the mild steel surface. Plating is continued for a time sufficient to deposit a copper layer approximately 0.0003 inch thick. After rinsing, the copper-plated tube is immersed in a conventional, non-cyanide zinc plating bath containing sodium zincate and cathodically biased to electrodeposit metallic zinc onto the copper. This plating is continued for a time sufficient to deposit a zinc layer approximately 0.0002 inch thick. The doubly plated tube is rinsed and dried and is ready for welding.

Case 12 is formed of a commercial hot dipped galvanized steel sheet about 0.022 inch thick. An exterior surface 22 and an interior surface 24 bear a metallic zinc coating about 0.0005 inch thick, not shown in the Figures because of its relative thinness in comparison to the thickness of the case. Case 12 comprises an opening 26 suitable for evacuating the interior of the completed actuator.

Referring again to FIG. 1, the doubly plated tube 10 is arranged for welding adjacent case exterior surface 22 about opening 26 such that tube faying surface 16 lies in juxtaposition to a case faying surface 28 circumferentially about opening 26. Contact between faying surfaces 16 and 28 is initially at projection 18. An annular electrode 30 is placed about the tube seated against flange surface 20. A second electrode 32 presses against case surface 24 opposite faying surface 28. Electrodes 30 and 32 are formed of a copper-chromium alloy material designated RWMA class 2.

For welding, the electrodes are pressed together with a force of about 310 pounds per square inch to produce intimate contact at projection 18. An alternating electrical current is applied between the electrodes. The current parameters are 60 Hertz, about 10,000 amperes rms and about 1.1 volts rms. The current is applied for about 2 cycles, which is about one-thirtieth of a second. The electrical current encounters an impedance between faying surfaces 16 and 28. Although this impedance is relatively small, the substantial amperage creates intense heating in accordance with known electrical principles. Projection 18 restricts the current path to localize and intensify heating. This resistive heating is believed to produce temperatures approaching 2500° F., sufficient to fuse steel. In comparison, zinc vaporizes at about 1600° F. and copper melts at about 1980° F. It is believed that the heat vaporizes zinc at the faying surfaces and melts copper. The vaporized zinc is expelled from between the faying surfaces and produces a black smut that deposits on nearby regions of case surface 22. The pressure applied by the electrodes extrudes the copper from projection 18 and brings the steel substrates into contact. The steel fuses initially at projection 18 and progresses outwardly until the majority of the faying surfaces are fused. After the current ceases, the weld region cools and the metals solidify.

Figure 2:
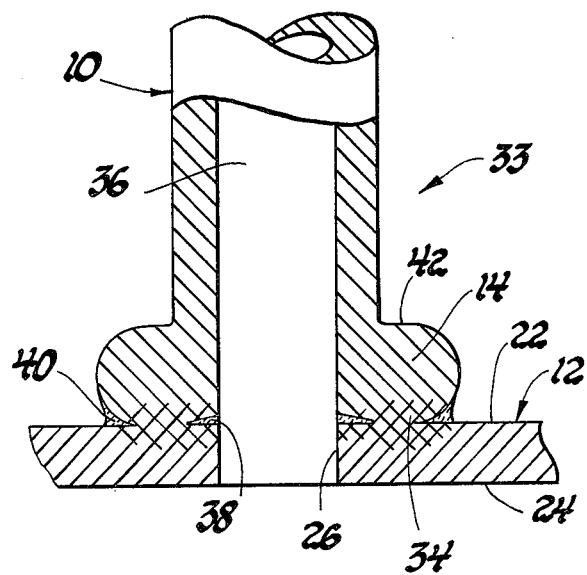
FIG. 2 is a cross-sectional view of a welded product formed by the welding operation shown in FIG. 1.

Referring to FIG. 2, wherein like numerals to FIG. 1 indicate corresponding preweld elements, the welding operation produces an integral assembly 33 comprising tube 10 and case 12 bonded by a fused steel weld 34. Microscopic examination indicates a copper-base metal 38 and 40 at the inner and outer perimeters of weld 34, exaggerated in FIG. 2 for clarity. Copper-base metal is also found within microscopic pores and fissures in the fused steel (not shown). It is believed that during welding the copper plate on faying surface 16 melts to form a predominantly copper liquid which may contain minor amounts of zinc and iron. A portion of the liquid becomes trapped within microscopic voids in the steel during fusion bonding. However, the major portion is extruded to the weld perimeter. During cooling, copper liquid at the perimeter may be drawn into fissures in the welded steel, which steel solidifies first because of its higher melting point. Thereafter, the copper solidifies within the pores and fissures to hermetically seal the weld 34. The remaining copper solidifies at 38 and 40, in a manner similar to brazing. This further seals and strengthens the joint, although the overall joint strength is believed to be principally derived from weld 34. Thus, the method of this invention not only tightly bonds, but hermetically seals tube 10 to case 12 to minimize air leakage that would otherwise interfere with the desired gas evacuation function of passage 36.

In the welded assembly 33, the steel substrates are generally protected against corrosion by the combination of copper and zinc plates on tube 10 and the galvanized zinc coating on case 12. However, surface 42 of assembly 33, which is derived from tube flange surface 20, exhibits a golden tint, in contrast to the metallic silver or gray of the plated or galvanized zinc and indicative of the copper plate. During welding, the electrical current also encounters resistance crossing between electrode 30 and flange surface 20 and resistively heats surface 20 to vaporize zinc from the surface and expose the copper plate. Zinc vaporization is evidenced by smut on electrode 30 and nearby portions of tube 10. However, the copper plate survives this heat and covers surface 42 in the product assembly 33 to protect the underlying steel against corrosion. During heating, a portion of the zinc at surface 42 is not vaporized, but rather is alloyed into the exposed copper plate surface. This brass surface may inhibit corrosion of the copper plate, providing additional protection for surface 42.

In the described embodiment, one member (i.e., tube 10) is coated prior to welding by about 0.0003 inch thick copper plate and about 0.0002 inch thick zinc plate. It has been found that a copper thickness of about 0.0002 inch suitably reduces air leakage, but does not consistently produce a hermetic weld. A copper layer between about 0.0003 and 0.0005 inch thick is preferred. Because of vaporization, the zinc thickness is not as significant in achieving a hermetic weld. A zinc plate as low as 0.0001 inch thick is believed to be suitable. This is in contrast to the 0.0005 inch thick galvanized zinc coating of the second member in the described embodiment. The dual zinc and copper plates combine to provide corrosion inhibition of the underlying steel over surfaces unaffected by the welding operation. Thus, it is believed that less zinc is required for adequate steel protection than would be necessary in the absence of the intermediate copper layer. This thinner zinc coating may lessen the amount of smut and thereby reduce smut buildup on the electrode in contact with the dual plated surface. Thus, less frequent cleaning may be required to maintain the electrodes in a mass production application which, because cleaning typically removes electrode material, may extend the electrode life. Although the copper and zinc layers are preferably electroplated, other methods are suitable for applying the metallic coatings. The copper and zinc preferably coat both the faying surface and the electrode contact surface. However, the intermediate copper layer may be suitably applied only to the faying surface to produce a hermetic weld, if corrosion protection of exterior, weld-affected surfaces is not desired.

In the described embodiment, a dual plated member is welded to a galvanized steel member. A galvanized steel is preferred for the second member because it is readily commercially available and relatively inexpensive, although other zinc-coated steel may be suitable. The method of this invention may also be employed for welding zinc-coated faying surfaces each having an intermediate copper layer. Although a resistance projection welding operation is performed in the described embodiment, the method of this invention is also suitable for other resistance welding operations, such as spot welding or seam welding, to form a hermetic weld or provide corrosion protection of weld-affected exterior surfaces.

While this invention has been described principally in terms of preferred embodiments thereof, it is not intended to be limited to said embodiments but rather only to the extent set forth in the claims that follow.

The embodiments of the invention in which an exclusive property or privilege is claimed are defined as follows:

1. A method for forming a hermetic weld between zinc-coated steel members, at least one of said members having a metallic copper layer between the zinc coating and the steel, said method comprising temporarily heating faying surfaces of the members to fuse the steel, said heating being generated by an electrical current passing between the members at the faying surfaces and applied by electrodes in contact with a surface of each member remote from the faying surface, said copper layer extending at the faying surface and the electrode contact surface of said one member, said copper layer at the faying surface being sufficient to melt during heating, flow into fissures formed in the fused steel and thereafter solidify to hermetically seal the weld, said copper layer at said electrode contact surface being sufficient to protect the underlying steel against corrosion despite zinc vaporization from said surface during welding.

2. A method for forming a hermetic weld between thin zinc-coated steel members, each member comprising a faying surface for the intended weld and a surface opposite the faying surfaces, at least one of said members having a metallic copper layer intermediate the zinc coating and the steel at the faying and opposite surfaces, said method comprising
   juxtaposing the faying surfaces,
   contacting the opposite surfaces with electrodes,
   pressing the electrodes together to press the faying surfaces into intimate contact,
   applying a short duration, high amperage alternating electrical current between the electrodes to temporarily resistively heat the faying surfaces to a temperature sufficient to fuse steel and form the weld, said heating vaporizing zinc from the faying surfaces and melting the copper layer, which copper melt is extruded by the electrode pressure to expose the steel for fusion bonding, said copper melt flowing into fissures within the fused steel and after said current solidifying to seal the weld,
   said electrical current also heating the opposite electrode-contact surface of said member having the copper layer to vaporize zinc from said surface, whereupon the copper layer is exposed and protects the underlying steel against subsequent corrosion.

3. A resistance welded, hermetically sealed, corrosion resistant joint between zinc-coated steel members, at least one of said members comprising a copper layer between the zinc coating and the steel, said joint comprising a fused steel weld and being characterized by copper metal in fissures within the fused steel and about the weld perimeter that hermetically seals the weld and further by exposure of the copper layer at an exterior surface where the zinc coating is disrupted by the welding operation to provide there corrosion protection for the underlying steel.

* * * * *